United States Patent

Bouchet

[15] 3,640,701
[45] Feb. 8, 1971

[54] DIRECT REDUCTION OF OXIDES

[72] Inventor: Jean Bouchet, Clery-Saint-Andre, France
[73] Assignee: Creusot-Loire, Paris, France
[22] Filed: July 7, 1969
[21] Appl. No.: 852,142

Related U.S. Application Data

[63] Continuation of Ser. No. 454,079, May 7, 1965, abandoned.

[30] Foreign Application Priority Data

Apr. 30, 1964 France ................................. 973121
July 16, 1964 France ................................. 981930
July 21, 1964 France ................................. 982484
Feb. 25, 1965 France ....................................... 6991

[52] U.S. Cl. .......................................... 75/40, 75/60, 75/92
[51] Int. Cl. ............................................................ C21b 11/06
[58] Field of Search ..................... 75/38, 40, 43, 60, 82, 92

[56] References Cited

UNITED STATES PATENTS 1,217,367  2/1917  Thomas et al. ................... 110/88 UX
1,807,468  5/1931  Brackelburg .............................. 74/43
3,169,055  2/1965  Josefsson et al. ......................... 75/40

Primary Examiner—L. Dewayne Rutledge
Assistant Examiner—J. Davis
Attorney—Cameron, Karkam & Sutton

[57] ABSTRACT

Metal oxides difficult to reduce are reduced in a rotating furnace heated by a short flame having a temperature of at least 1,900° C. produced by converting a gaseous hydrocarbon into carbon monoxide and hydrogen by partial combustion with oxygen at about 1,250° C. The carbon monoxide and hydrogen are burned in a furnace in a jet of oxygen directed toward the top of the furnace at about 1,900° C. producing carbon dioxide and water with release of heat.

3 Claims, 5 Drawing Figures

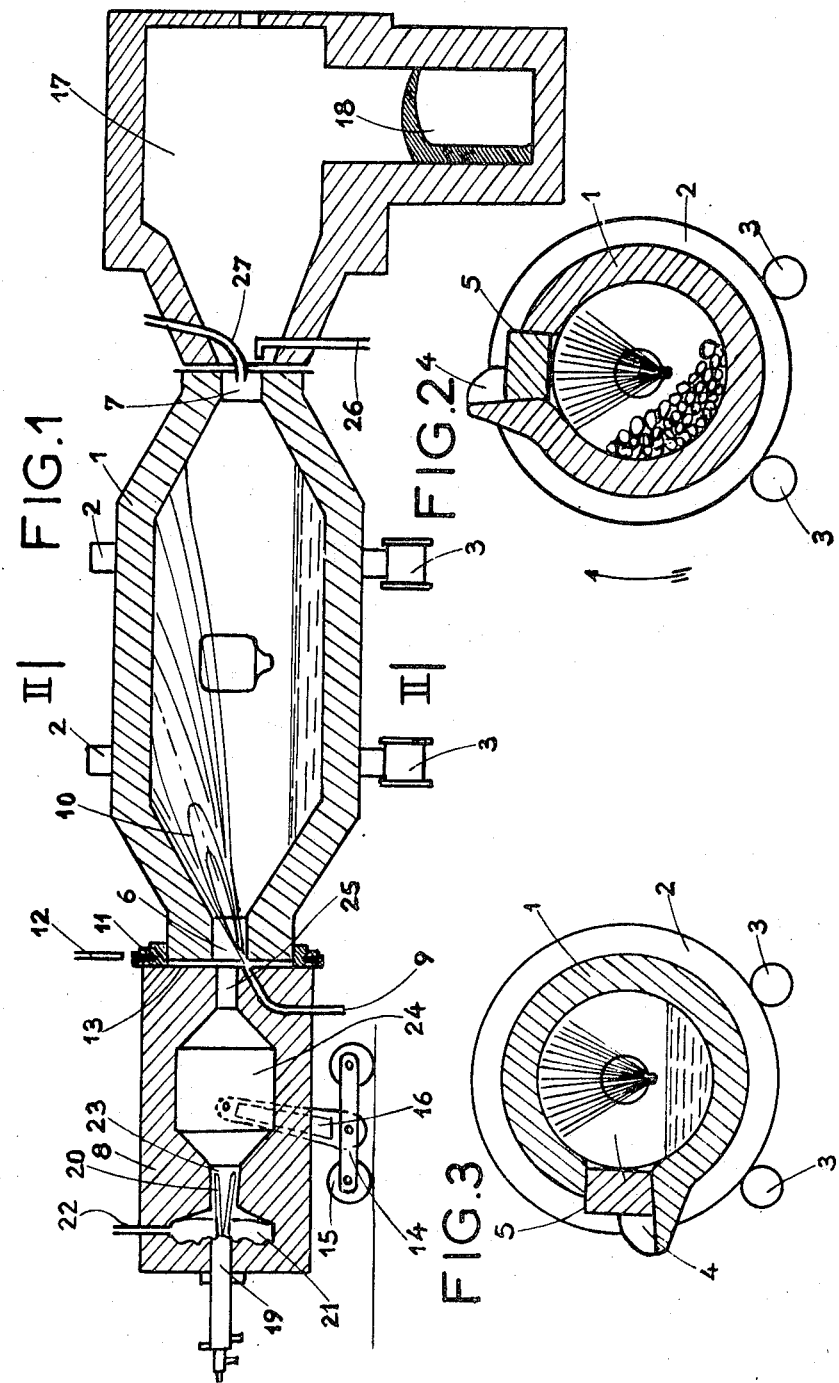

DIRECT REDUCTION OF OXIDES

REFERENCE TO RELATED APPLICATION

This application is a streamlined continuation of application Ser. No. 454,079, filed May 7, 1965, by applicant herein and now abandoned.

The invention concerns the direct reduction of oxides which are difficult to reduce, for example ores, which may or may not be already prereduced, of metals used in making steels.

Various processes have hitherto been used for carrying out direct reduction of ores.

For example, chromium ore has hitherto been reduced in electric arc furnaces, and these furnaces have already been used for obtaining other metals which are required in making steels, and whereof the free energy of combination with oxygen is at least equal in absolute value to that of iron. The chief reason for this form of procedure is the convenience of the electric furnace in producing temperatures exceeding 1,800° C., which are required for most of these reductions. However, treatment in the electric furnace has a number of disadvantages, and cannot be used with all metals. Moreover, the electric arc from the carbon electrode maintains in part of the furnace a carburized atmosphere which is useful in reducing metallic oxides, but is an obstacle to the production of low-carbon alloys or metals. Using the electric furnace therefore generally requires a second operation for reducing the carbon contents obtained during initial reduction of the ore. This second operation increases the cost of the process, particularly since it involves the loss of some of the metal originally reduced.

The work leading up to the present invention has made it possible to determine the combination of means required to treat oxides which are difficult to reduce, under conditions such that the operation is economical, performs the reduction without difficulty, and makes it possible to obtain in highly flexible fashion the desired compositions of steels or alloys having the desired carbon contents, by the use of a high-temperature flame in a rotating furnace and under conditions of reduction which are particularly advantageous and do not destroy the lining of the furnace.

According to the invention, the reduction furnace comprises a combination of a rotary furnace having a substantially horizontal axis of rotation, this furnace being open at both ends, means situated at one end of the furnace for producing an oxidizing flame having the hottest part at a temperature of at least 1,900° C., this flame being produced in a zone of the furnace situated above the reducing zone located in the vicinity of the metallic bath, and means for discharging the fumes at the other end of the furnace.

The invention will now be described with reference to preferred embodiments thereof which are described by way of example and are illustrated in the appended drawings.

In the drawings:

FIG. 1 is a longitudinal section through a furnace according to the invention;

FIG. 2 is a section along II—II in FIG. 1, the charging door of the furnace being at the top, and the charge being in the solid state;

FIG. 3 is a section along III—III in FIG. 1 after the furnace has rotated by a certain amount, and the charge being liquid;

Figure 4:
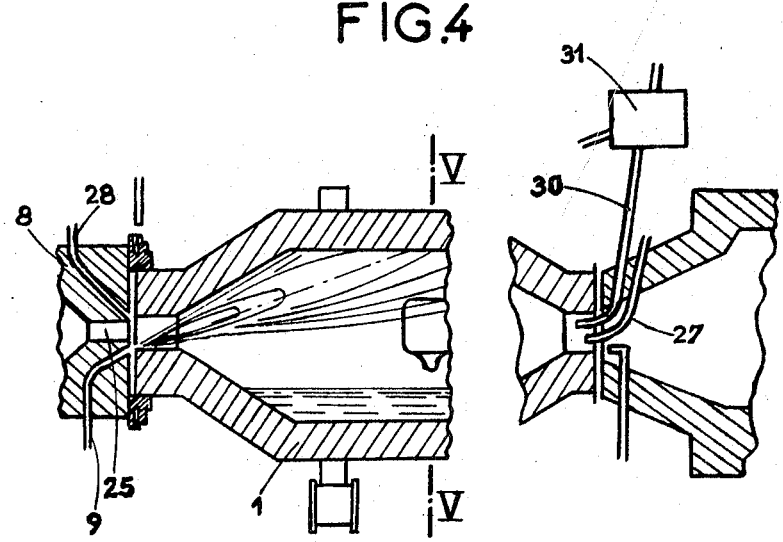
FIG. 4 is a vertical longitudinal section through a variant of the reducing furnace, the latter being only partially illustrated, with parts cut away.
Figure 5:
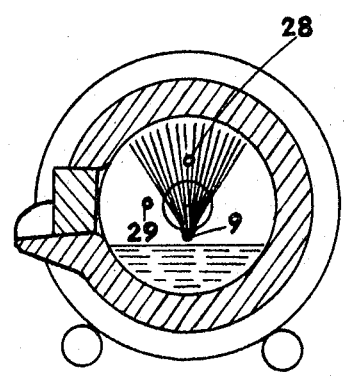
FIG. 5 is a section along V—V in FIG. 4.

The furnace illustrated in FIGS. 1 to 3 comprises a rotating furnace 1, having a horizontal axis, mounted on annular guides 2 resting on rollers 3. Rotation may be imparted to the furnace either by driving one or more of the rollers 3 or by a toothed rim carried by the furnace, in mesh with a control pinion. The furnace includes a charging door 4, normally closed by a blocking member 5, through which door pouring takes place.

The furnace is open at both its frustoconical ends 6 and 7, and is lined with refractory bricks, for example of magnesia.

At its end 6, the furnace receives a combustible gas from an autothermic natural-gas converter 8 or from a liquid-fuel gas-generator, the characteristics and operation of which will be explained later.

The gas is ignited at the inlet 6 of the furnace by a jet of oxygen emanating from a conduit 9. The jet of oxygen enters the furnace with an inclination which may be adjusted as a function of the metallurgical operation to be carried out; it is preferably directed upwards, and may be at an angle of 20° to the horizontal. The velocity of this jet of oxygen at the instant when it enters the furnace is considerably greater than that of the flow of combustible gas from the converter 8, with the result that the flame 10 may be orientated towards the top of the furnace.

A fluidtight packing 11 is carried by the furnace 1, and is cooled for example by a flow of water from a pipe 12 and running into a peripheral groove in the packing. This packing is in contact with an annular portion of the face 13 of the converter 8, and rubs gently against this face.

The converter 8 is mounted on a carriage 14 which is displaceable with respect to the furnace in order that the aperture at the end 6 may be opened. Displacement of the converter 8 may be parallel to the vertical plane passing through the longitudinal axis of symmetry of the furnace 1, or oblique to this plane, or perpendicular thereto.

In the case of the embodiment illustrated, the converter moves parallel to the longitudinal axis of the furnace, the carriage 14 being mounted on wheels 15 running on rails.

The body of the converter 8 is supported by two links 16 articulated at the bottom to the carriage 14, and at the top to each side of the converter, substantially on the horizontal axis passing through the center of gravity of the converter.

The links 16 are inclined towards the furnace, against the end of which the converter bears with a pressure which is variable with the inclination of the links 16. Adjustment of this inclination by altering the position of the carriage 14 thus enables the pressure exerted on the packing 11 to be adjusted. This arrangement also ensures that, while the furnace is rotating, the axis of the converter is automatically oriented perpendicularly to the plane in which the packing 11 provides a fluidtight seal. A completely fluidtight seal is thus obtained while maintaining low pressure on the face of the packing 11.

The end 7 of the furnace 1 opens out, with a small clearance, facing the aperture of a fume-chamber 17 which conveys the combustion gases to a chimney-flue 18. This fume-chamber might naturally, like the converter 8, be mounted on a carriage, enabling the outlet 7 of the furnace to be freed upon the furnace being stopped.

The converter 8 comprises a cooled burner 19 which receives natural gas consisting essentially of methane. This burner 19 is located on the axis of the converter, and may for example receive a quarter by volume of the gas required to heat the furnace, and a flow of oxygen of at least two volumes to one volume of gas. The flame 20 of the burner 19 passes through an annular chamber 21 having, for example, approximately the shape of a torus and fed with natural gas through a conduit 22 terminating tangentially to the periphery of the chamber 21.

The flame 20 opens out into a venturi 23. After having undergone turbulence at the foot of the flame of the burner 19, the natural gas supplied by the conduit 22, and representing approximately three times by volume as much as the gas feeding the burner 19, passes through the venturi 23, mixing with the flame 20, is heated up there, and starts dissociating, which it can practically achieve as a result of remaining for a short time in the dissociating chamber 24. It is therefore dissociated gas which emerges through the orifice 25 at the inlet of the furnace. This flow of combustible gas then encounters the jet of oxygen emerging from the conduit 9. The quantity of oxygen introduced through the conduit 9 is such that at any instant it can cause combustion of the gases in the furnace 1, whether these gases have been introduced through the orifice 25 or produced in the furnace itself, as a result, for example, of the ore being reduced by the carbon.

The gases conveyed to the furnace are naturally accurately measured by appliances which give practically instantaneous adjustment of delivery as a function of indications by a continuous analyzer of the fumes picked up at the outlet of the furnace by a tube 26. It is thus possible to obtain without difficulty, and at any instant, a composition for the fumes which is considered to be the best.

An oxygen-blower nozzle 27 is disposed at the outlet for the fumes in order to introduce into the furnace a jet of oxygen below the flame of the burner.

It has in fact been found that the rate at which the fumes circulate in the furnace causes carbon monoxide from the bath to circulate to the burner, passing below the flame. This circulation of carbon monoxide results from the suction set up by pulsation of the jet of gas blown in.

Use may be made of this circulation by burning the carbon monoxide emanating from the bath by introducing a secondary jet of oxygen in the same direction as the carbon monoxide circulates, this jet being introduced through the nozzle 27.

FIGS. 2 and 3, the first showing the charge not yet melted, and the second showing the melted charge, illustrate how the jet of oxygen in the flame of the furnace prevents the flame from coming into contact with the charge in the furnace and provides an oxidizing atmosphere at the top, above the reducing atmosphere which prevails in the vicinity of the charge in course of operation. The oxidizing atmosphere at the top causes the gases to be practically completely burnt as supplemented by combustion of the carbon monoxide given off from the bath.

It has been found that reduction of the oxides of metals whereof the free energy of combination with oxygen is at least equal to that of iron requires, in the furnace which has just been described, a flame 10 whereof the hottest part is at least at 1,900° C. This high temperature may be used with an oxidizing flame since separation occurs between the oxidizing zone at the top and the reducing zone at the bottom. The refractory lining of the furnace is protected from the effects of the high temperatures involved by the fact that the calories delivered to the walls are picked up by the charge in the furnace by virtue of the rotary motion of the furnace before they have had time to diffuse deeply into the thickness of the refractory lining. It is even possible to reach a temperature close to the melting point of the lining on the surface thereof where the jet of gas impinges without any resultant disadvantage, and with excellent thermal efficiency.

It has furthermore been discovered that the furnace according to the invention, wherein the hottest part of the flame is at least at 1,900° C., provides an especially advantageous phenomenon.

Combustion of methane by oxygen theoretically produces a flame temperature of 5,000° C. The converter 8 described with reference to the Figures actually delivers to the orifice 25 a combustible gas preheated to 1,250° C., the hottest part of the flame, according to measurements, does not substantially exceed 2,200° to 2,300° C. In addition, it has been discovered that the surface area of this hottest part of the flame is very small, and does not exceed about a thirtieth of the surface area of the walls of the lining, which, with the flame temperature of 2,200° C. to 2,300° C. as above indicated, remains at a temperature of 1,900° C. when the furnace is in operation.

In spite of the small temperature difference between the flame and the walls and the disproportion between the radiating surface area, a considerable flow of heat passes into the furnace. Now radiation, even if aided by convection, cannot account for the large amount of this flow. In fact, in the furnace according to the invention the temperature of the flame is limited by dissociation of some of the fumes produced into unstable atoms and radicals, which will reunite into molecules with corresponding liberation of heat, at other points in the furnace remote from the reaction zone of the flame 10 of the burner, more particularly upon encountering the walls of the lining. A large proportion of the heat available is thus transferred by a means which is neither radiation nor ordinary convection which participate in conventional furnaces. This means is obtained with a furnace according to the invention whereof the flame has a hot part at at least 1,900° C., and whereof the fumes contain molecules capable of easy dissociation, chiefly molecules of carbon dioxide, hydrogen and water. This circumstance makes it possible to have a large quantity of calories distributed over the lining, with the result that there is no risk of the latter melting in the vicinity of the flame.

The autothermic converter 8 which has been described delivers a combustible gas consisting essentially of carbon monoxide and hydrogen, starting from natural gas. This latter may be assimilated to pure methane, and the autothermic conversion which is obtained may be schematically represented by the chemical formula

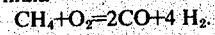

$$CH_4 + O_2 = 2CO + 4H_2.$$

In actual fact, naturally a few percent of carbon dioxide and water are produced, while at the same time a corresponding quantity of undissociated methane remains. This is of little importance, since almost all the gas is dissociated, while the heat liberated by the reaction heats up the products to 1,250° C. The body of the converter 8 may be perfectly heat insulated, and the raw gas may thus be transformed with a thermal efficiency very close to unity.

If, as opposed to what happens in the furnace according to the invention, the natural gas were used cold and undissociated, the flame, even with oxygen as the fuel, would be much longer and much less active, and the methane would take a relatively long time to burn, and would not burn completely over the length of the furnace.

In the furnace according to the invention, total combustion takes place in a short time with a short flame, and adjustment may be made for a very hot flame, making it possible to obtain good heat-efficiency and a high temperature throughout the furnace.

The invention will now be described with reference to various examples of use of the process.

EXAMPLE 1

A furnace according to the invention having an effective diameter of 1.20 meter, and the length between the rotating packing and the inlet of the fume-chamber being 4 meters, was charged with 1,200 kg. of chromium ore, having the following composition by weight:

| | |
|---|---|
| $Cr_2O_3$ | 55.9 % |
| FeO | 14.4 % |
| $SiO_2$ | 6.0 % |
| MgO | 12.5 % |
| $Al_2O_3$ | 10.3 % |

This ore had previously been mixed with a quantity of lime carbonate or a quantity of baked lime corresponding to 80 kg. of CaO. 300 kg. of carbon were also added. All the materials used were in grains the largest of which did not exceed 8 mm. in diameter, and the smallest were at least 1 mm. in diameter.

The carbon above referred to may be metallurgical coke fines, or graphite having a sulfur content of less than 0.2 percent using graphite has the advantage that it is easy to obtain a very low sulfur content in the metal, generally less than 0.01 percent.

After charging, the furnace was set in operation with a constant consumption of natural gas of 135 normal cubic meters per hours. The temperature of the hottest part of the flame was 2,200° C.

The consumption of oxygen was 295 normal cubic meters for the first hour, and 370 cubic meters subsequently.

After the furnace had been oscillating for an hour and a quarter, the temperature of the charge reached 1,700° C., and 100 kg. of carbon were added to the charge.

Three-quarters of an hour later, 100 kg. of carbon were added.

The charge reached a temperature of 1,820° C., and a large bath of metal formed below the slag.

Heating was carried on for half an hour, and then 503 kg. of metal were poured, having the following composition by weight:

| | |
|---|---|
| C | 10.30 % |
| Cr | 66.6 % |
| Mn | 0.5 % |
| | S and P less than 0.012 % when the graphite is used as carbon. |
| Fe | remainder |

The slag (580 kg.) had the following composition by weight:

| | |
|---|---|
| $Cr_2O_3$ | 18.7 % |
| FeO | 4.0 % |
| $SiO_2$ | 13.0 % |
| CaO | 14.0 % |
| MgO | 24.7 % |
| $Al_2O_3$ | 22.8 % |

This slag was sufficiently fluid to be poured, and contained a few droplets of metal which were unable to free themselves and join the ferrochromium bath.

EXAMPLE 2

For making a very low-carbon ferrochromium, a start was made with the same quantity of chromium ore as in Example 1, having the same composition, and reduction was carried out in the same furnace.

A charge of the order of 150 to 300 kg. of baked lime was added to the 1,200 kg. of chromium ore.

The gases were adjusted in strictly stoichiometric fashion at 135 normal cubic meters of natural gas to 270 normal cubic meters of oxygen per hour.

At the end of two and a quarter hours the bath reached 1,820° C., and heating was stopped.

A charge of 220 kg. of 98 percent silicon and 150 kg. of baked lime was introduced.

The furnace then continued to rotate for 35 minutes, after which 538 kg. of metal were poured, having the following composition by weight:

| | |
|---|---|
| C | 0.02 % |
| Cr | 69.20 % |
| Si | 0.30 % |
| Mn | 0.05 % |
| Fe | remainder |

The perfectly fluid slag weighed 1,375 kg. (when the amount of lime added was 300 kg.), and had the following composition by weight:

| | |
|---|---|
| $Cr_2O_3$ | 7.4 % |
| FeO | 2.5 % |
| $SiO_2$ | 34.7 % |
| CaO | 32.6 % |
| MgO | 13.0 % |
| $Al_2O_3$ | 9.5 % |

EXAMPLE 3

A steelworks operation, for the manufacture of a low-carbon stainless steel, hitherto carried out in an electric furnace with oxygen blown into the metallic bath, was performed in the furnace according to the invention without blowing in any oxygen, and gave a greater yield of chromium than that obtained in the electric furnace.

The furnace for Examples 1 and 2 was charged with 1,000 kg. of ordinary half-hard scrap steel and 500 kg. of carburized ferrochromium containing 65 percent by weight of chromium and 8.6 percent carbon.

A little slag from a foregoing operation remained in the furnace, so no flux was added to the charge.

At the end of an hour and a half of heating, the bath was melted and covered with a thin, dry skin of slag; the temperature of the bath was 1,490° C. A test-piece had the following composition by weight:

| | |
|---|---|
| C | 1.95 % |
| Cr | 21.96 % |
| Fe | remainder. |

Forty minutes later the temperature had risen to 1,700° C., and the composition by weight was:

| | |
|---|---|
| C | 0.09 % |
| Cr | 12.85 % |
| Fe | remainder |

After 20 minutes of additional heating, the temperature of the bath exceeded 1,800° C., and the composition by weight was:

| | |
|---|---|
| C | 0.02 % |
| Cr | 3.90 % |
| Fe | remainder |

The slag, which was greater in quantity, but still only slightly fluid, had the following composition by weight:

| | |
|---|---|
| $Cr_2O_3$ | 57 % |
| FeO | 19.35 % |
| CaO | 7.08 % |
| MgO | 9.07 % |
| $SiO_2$ | 4.00 % |
| $Al_2O_3$ | 1.80 % |

Heating was then stopped, and the furnace was rapidly charged with a mixture in granular form of lime and 98 percent ferrosilicon containing 150 kg. of lime and 150 kg. of silicon.

The furnace was closed again, and resumed its oscillatory motion until pouring took place 40 minutes later. The temperature before pouring had dropped again to 1,610° C.

The metal had the following composition by weight:

| | |
|---|---|
| C | 0.025 % |
| Si | 0.40 % |
| Mn | 0.32 % |
| Cr | 20.70 % |
| Fe | remainder |

The slag, totaling 690 kg. in weight, had the following composition by weight:

| | |
|---|---|
| $Cr_2O_3$ | 7.7 % |
| FeO | 2.05 % |
| CaO | 26.0 % |
| MgO | 13.08 % |
| $SiO_2$ | 49.20 % |
| $Al_2O_3$ | 2.07 % |

This slag poured easily.

EXAMPLE 4

The slag floating on the metallic bath of Example 3 has a composition at the end of the operation every close to that of a chromium ore.

The operation of Example 3 was resumed, rich chromium ore being introduced into the charge instead of carburized ferrochromium.

Reduction was carried out in the same way, by the same operation of silicon-heating as in Example 3.

EXAMPLE 5

The furnace according to the invention was charged with 400 kg. of ordinary soft scrap steel, 800 kg. of chromium ore ($Cr_2O_3$ 57 percent) and 170 kg. of graphite. The burner adjustment was the same as in Example 1.

The furnace was set in rotation, and then opened at the end of an hour and a quarter. There was found to be a molten bath having a chromium content of about 12 percent and a carbon content of 5.5 percent. There were some granules of unmelted chromium ore above the bath. The temperature of the bath was then 1,720° C.

The furnace was then charged with an additional 50 kg. of graphite in order to allow the temperature to reach 1,850° C.

The bath was then finally refined by oxygen transfer between the flame and the bath. This refining may also be carried out by injecting oxygen into the bath.

Twenty minutes after the beginning of oxygen-transfer between the flame and the bath, the latter had a carbon content of about 0.10 percent and a chromium content of 6 percent.

Adding 350 kg. of extra soft scrap steel, or iron powder, then enabled the carbon content to be reduced to 0.04 percent, the furnace continuing to be heated by the flame and to rotate. The chromium content then changed to about 2.5 percent.

Heating was then stopped, and the furnace was rapidly charged with a mixture of grains of lime and 98 percent ferrosilicon containing 150 kg. of lime and 150 kg. of silicon. The furnace was then closed again, and resumed its oscillatory motion, which it maintained until pouring, forty minutes later. At this instant, the temperature had again dropped to 1,600° C.

The poured metal had the following composition by weight:

| | |
|---|---|
| C | 0.04 % |
| Si | 0.40 % |
| Cr | 20.00 % |
| Fe | remainder |

The slag, 1,200 kg., had the following composition by weight:

| | |
|---|---|
| $Cr_2O_3$ | 8.02 % |
| FeO | 3.05 % |
| CaO | 20.98 % |
| MgO | 19.03 % |
| $SiO_2$ | 36.97 % |
| $Al_2O_3$ | 11.95 % |

The slag was fluid, and poured rapidly.

EXAMPLE 6

Spiegel reduced metal was produced in the furnace according to the invention. The operation was carried out in the following manner:

The furnace was charged with 250 kg. of ore rich in manganese (54 percent manganese), 850 kg. of extra soft scrap steel, 50 kg. of lime, and 210 kg. of coke grains or coke dust.

The furnace was set in rotation, with a flame the hottest part of which had a temperature on the order of 2,250° C.

The furnace was opened at the end of an hour and a half, and the metal and the slag, both liquid, were poured.

The metal, weighing about 1,000 kg., had the following composition:

| | |
|---|---|
| Mn | 12 % |
| C | 6 % |
| Fe | remainder |

EXAMPLE 7

Refined ferromanganese was produced in the following manner:

The rotary furnace was charged with 1,500 kg. of 54 percent manganese ore and 250 kg. of baked lime. 300 kg. of coke grains were added.

The furnace was set in motion, and then opened at the end of 2 hours. The temperature of the bath was 1,850° C.

The carbon content was then reduced by direct oxygen-transfer from the flame, and then the furnace was opened at the end of 30 minutes. The carbon was then quantitatively analyzed, and blowing in oxygen was resumed for a few minutes. At this stage, the temperature of the furnace reached 1,850° C., and the carbon content of the metal was 1 percent.

Fifty kg. of 75 percent ferrosilicon, 80 kg. of lime and 50 kg. of manganese ore were then added, and the silicon-heating operation was carried out as for the treatment of chromium ore described in the foregoing examples.

The metal produced, weighing about 1,000 kg., had the following composition by weight:

| | |
|---|---|
| Mn | 78 % |
| C | 0.9 % |
| Fe | remainder |

EXAMPLE 8

Hadfield steel was produced in the furnace according to the invention.

The rotary furnace was charged with 260 kg. of manganese ore, 850 kg. of soft scrap steel, 210 kg. of graphite and 100 kg. of lime, and then the furnace was set in operation.

At the end of an hour and a half the furnace was opened, after which the metal was matched to the desired final composition by oxygen-blast.

The metal obtained, weighing about 1,000 kg., had the following composition by weight:

| | |
|---|---|
| Mn | 13 % |
| C | 1.3 % |
| Fe | remainder |

EXAMPLE 9

The furnace according to the invention was used to produce chromium-nickel stainless steels by direct reduction of silicated nickel ores.

The furnace was charged with 400 kg. of soft scrap steel, 800 kg. of very rich chromium ore (57 percent $Cr_2O_3$), and 600 kg. of nickel silicate ore containing 3.20 percent of the total of nickel and cobalt.

220 kg. of graphite were added to the charge.

The furnace was set in operation, and then opened at the end of 1 hour and 40 minutes.

At this stage, the metal had the following composition by weight:

| | |
|---|---|
| C | 5.02 % |
| Cr | 10.03 % |
| Ni+Co | 4.00 % |

The slag was partially melted, and the temperature of the bath was 1,800° C.

Decarburization of the metal was carried out by blowing in oxygen until the carbon content was about 0.10 percent.

Adding 350 kg. of iron powder then enabled the carbon content to be reduced to 0.04 percent.

The metal obtained was then subjected to a silicon-heating operation similar to that described in Example 5.

The steel produced, weighing 1,100 kg., had the following composition:

| | |
|---|---|
| C | 0.04 % |
| Cr | 18.00 % |
| Ni | 1.6 % |
| Fe | remainder |

Additional nickel was contributed in the ladle by a ferronickel.

The slag was fluid, and in considerable quantity.

It was possible to obtain chromium-nickel structural steels by the process which has just been described.

EXAMPLE 10

The furnace according to the invention was used for reducing zinc oxide.

This reduction is particularly difficult by the usual processes, since the zinc produced tends to reoxidize as soon as reduction is finished, its production temperature generally being too low. By virtue of the invention, reduction carried out at high temperature enables metal to be obtained with very high efficiency.

1,000 kg. of an oxidized agglomerate of zinc emanating from blende-roasting were charged into the furnace, together with 210 kg. of coke dust and 300 kg. of scrap. It should be noted that the addition of scrap is not indispensable, and may be omitted.

The flame was adjusted so as to give a temperature at its hottest part on the order of 2,300° C., and so as to make it more oxidizing than in the foregoing examples.

The furnace was opened at the end of an hour and a half.

Analyses of the metal and the slag indicated that the zinc oxide had been completely reduced. The highly volatile zinc was recovered in the furnace fumes by a conventional process. The operation of recovering the zinc was facilitated by the small volume of fumes produced and the high zinc content of these fumes. The efficiency of the operation was the order of 90 percent.

The furnace described with reference to FIGS. 1 to 3 and that described with reference to FIGS. 3 and 4 may also be used for treating complex lateritic ores and for the direct production of alloyed steels, and inter alia structural steels and stainless steels.

The world possesses very large deposits of chromium-bearing and nickel-bearing laterites produced by the deterioration of ultra-basic, periodotite or dunite rocks, as in the deposits in New Caledonia, the Philippines, Indonesia, Conakry in Guinea, the Dominican Republic, Jamaica, Cuba and Madagascar. In the Greek deposits the laterite is fossilized.

These laterites constitute a fairly homogeneous group of ores in which the deposits have the following structure. Below a red stratum of surface-deterioration containing iron and chromium, there is a lower stratum consisting of the oxides of iron, chromium and nickel and a gangue, usually in a very small proportion, consisting chiefly of alumina. These ores are furthermore generally pulverulent and very humid.

In numerous cases, the strata are thick, regular and exhibit little overthrust. Furthermore, several are in the immediate vicinity of the sea, and the ores which they yield are easily transportable without excessive costs.

In spite of these very favorable features, these ores are little used since they are unsuitable both for the production of commonly used steels, because of their chromium and nickel content, and for the production of commonly used iron alloys, because of their iron content.

These ores may be used for producing steel, and in particular structural alloyed steels and stainless steels.

The rotating furnace according to the invention, using a source of energy in the form of a gaseous or liquid fuel burnt in the presence of pure oxygen or heavily superoxygenated air, the carbon monoxide given off by reducing the ores being burnt at the same time, makes it possible to reach the very high temperatures required for reducing the oxides of chromium with reasonable efficiency and to transmit the heat produced by combustion under good conditions as regards, efficiency, using the walls of the furnace as an intermediate transfer agent, these walls being furthermore cooled by the bath, and therefore being able in suitable fashion to withstand radiation from the flame and further to separate the oxidizing atmosphere of the flames required for obtaining high temperatures from the reducing medium made up of the bath and the layer of slag and ores in the course of reaction.

The furnace according to the invention makes it possible to reduce simultaneously the oxides of iron, chromium and nickel contained in the laterites above-mentioned and enables valuable use to be made of them under advantageous conditions in conjunction with operations for the direct production of alloyed steels.

The rotating furnace may be easily adapted to the use of liquid fuels by replacing the natural-gas converter with an oxygen-and-fuel-oil burner, for example the toroid burner described in the periodical Steel Times of the 22nd May 1964, page 684. The deliveries of the oxygen-and-fuel-oil burners are adapted to the size of the treatment furnace. For example, for a furnace 3.10 meters in length and 1.6 meter in external diameter, the burner is made of such a size as to produce a maximum of 8,000 therms per hour.

The lateritic ore is charged after having been dried and screened to a suitable size (0.1 to 20 mm. in diameter). If the proportions of the chromium or nickel content on the one hand, and the iron content on the other hand, are insufficient in the laterites themselves, oxidized ores of chromium and nickel are added to the lateritic products, as also is nickel in the form of metal or ferronickel, and likewise the charge may comprise scrap containing chromium or chromium-nickel, and additives of molybdenum oxide, columbium oxide and ores rich in manganese.

The charge may be introduced into a preheater and solid-phase prereducer appliance coupled to the furnace using the fumes of the furnace wholly or partially as a heating and reducing agent. This appliance may be of the conventional type, rotating furnace, shaft-furnace, or fluidizer comprising one or more stages. It may also serve to dry the charge.

The charge may be introduced directly into the furnace.

Charging may take place at once or in several stages, or may be continuous. Charging in stages is useful for the preliminary heating treatment. In this case, the preheated ore and the fuel are added to the bath in such a manner as to keep the temperature constant.

Charging is carried out either through a lateral door in the case of the discontinuous charging, or through the end of the furnace opposite to the burner in the case of the continuous charging.

The reducer used is solid carbon of particle dimensions between 0.5 and 10 mm., as available in the usual commercial forms such as coal (preferably anthracite), coke dust, graphite, petroleum coke, or even carbon-black residue from acetylene-manufacturing operations. It is recommended that graphite be used when it is desired to obtain very pure alloyed steels.

At the end of the first period of the operation, which will hereinafter be called carbon-heating, it may be advantageous to add some pieces of calcium carbide, in order to complete the reduction of the oxides of chromium and to obtain a satisfactorily fluid slag.

Other reducers, iron alloys and aluminum, are used during the period of treatment beneath a reducing slag used with some products.

The reducer is mixed with the ore before charging into the reducing and melting appliance. This mixing may take place before the preheating stage when the fuel is only slightly reactive, or afterwards.

When operation is discontinuous, the charge consisting of ore and reducer in suitable proportions is introduced in one or more stages into the furnace, which has been previously heated and brought up to an internal temperature of at least 1,000° C.

The furnace is then set in rotation at a speed which increases progressively, and normally reaches 10 revolutions per minute in rotary furnaces, and three half-revolutions per minute in oscillating furnaces. The fuel and the burning agent (heavily super-oxygenated air or pure oxygen) are admitted simultaneously. Their proportional adjustment depends on the nature of the products introduced with the laterites and is calculated so as to obtain the highest possible flame temperature, without excessive oxygen transfer to the charge, and without excessive burning of the solid carbon introduced with the ore.

The operation starts with reduction of the oxides of nickel, iron and chromium with the aid of the carbon in the charge. This reduction is carried out in discontinuous chargings until the temperature reaches 1,900° to 1,930° C. At these temperatures, the bath is very heavily carburized, and is covered with a layer of slag upon which the solid reducer rests. According to the nature of the ores, the slag may be completely or imperfectly melted, even at these temperature levels. In the case of continuous charging, the operation is first of all carried on at a relatively high constant temperature level. This level reaches 1,700° C. in the case of a mixture of ores rich in chromium having a gangue containing alumina and magnesia of the type of Soviet ores sold in Western Europe and laterites having a gangue containing alumina and the charge remains in the pulverulent state up to these levels.

Addition of the charge is then stopped, charging with carbon being maintained. The temperature rises to 1,900° to 1,930° C. The slag becomes fluid, and the oxides of chromium are sufficiently reduced to make it possible to clean the slag.

The operation is followed by a period of refining, that is to say reduction of the carbon content. Refining is carried out on the one hand by increasing by a more or less large amount the proportion of oxygen in the fuel mixture, and on the other hand at the end of the operation either by direct injection of oxygen on to the bath through a highly pulsating nozzle located either in the converter and orientated downwards or introduced through the door in the direction of the bath. Rotation of the furnace is used to control the homogeneity of the bath after blowing.

Refining is stopped at the desired carbon level.

The addition of rich chromium ores at the beginning of the operation has been calculated so as to obtain a correct chromium content at the end of refining when the carbon content has reached the desired level.

When the steel is of the very low-carbon type, refining is followed in the furnace by a metal-heating operation such as silica-heating or alumina-heating. This operation is carried out with the furnace closed and in the absence of a flame and is preceded by an addition of pieces of lime in the case in which the slag has been cleaned at the end of carbon-heating.

The very high temperature level reached before and during metal-heating makes it possible to add considerable quantities of scrap used as a cooling agent and, if necessary, as an additional diluting agent for the carbon. A very pure iron or a much reduced iron powder may be used as a diluting agent.

It is likewise possible to incorporate a large proportion of scrap consisting of stainless steels containing chromium or chromium-nickel.

At this stage, the products introduced, reducing metal, scrap and lime, are first of all carefully dried. Metal-heating may also be carried out by simultaneously injecting lime, flux and reducing metal in powder form, as is current practice.

If the product to be produced is a stainless steel with a high degree of purity, the metal-heating agent is chosen with care. It may be 96 percent reduced silicon or first-melt aluminum. Likewise, the diluting agent is pure iron from an ore without intermediate remelting.

Once silicon-heating is finished, the metal is poured in the ladle with its required additives. Blowing in oxygen at the end of the refining period and the care taken in drying the additives during the slag-reducing period enable the hydrogen content to be limited to very low levels and the metal obtained sets correctly in the ingot-mold.

FIG. 4 shows the furnace, at one end of which the natural-gas converter 8 is situated. This converter opens out into the furnace through an orifice 25. It has an oxygen-conduit 9 directed towards the upper part of the wall of the furnace 1.

The converter also has a conduit 28 enabling oxygen to be blown on to the path at the instant of refining.

A third oxygen-conduit 29, which delivers a horizontal jet of oxygen to the furnace 1, enables the flame to be deflected at will towards a part of the lining of the furnace closer to the level of the bath.

At the end of the furnace opposite to the converter, there is an oxygen-conduit 27 which delivers a jet of oxygen below the flame and burns the carbon monoxide liberated from the bath.

Finally, at the same end of the furnace there may be a conduit 30 for continuously introducing the charge into the furnace. This conduit 30 may be fed by a fluidizer 31 for the charge in pulverulent form, fluidization enabling the pulverulent products to flow easily to the furnace. The conduit 30 may be cooled by air circulation.

The invention will now be described for use of the process for reducing lateritic ores.

EXAMPLE 11

Preparation of stainless steels comprising molybdenum known as 18-8 steels (AFNOR standards 26 CND 18-10-3 and 23 CND 18-10-3; AISI standards 316 and 316 L) was carried out in a small pilot furnace of the type described above. Its dimensions are as follows:

diameter: 1.20 meter
length: between rotating packing and chimney: 4 meters.

The furnace is lined with magnesia in the form of bricks. It is equipped with a lateral charging door. Calorific energy is introduced in accordance with the invention. The fuel used is purified Lacq natural gas having a low sulphur content. The oxygen is introduced into the furnace by three nozzles, one being nozzle 9 the jet being directed towards the top of the furnace. The second nozzle 28 has the jet, which is very highly pulsating, directed towards the bath, and the third nozzle 29 has the jet horizontal.

Oxygen is introduced on the chimney side through the nozzle 27.

The furnace has two movements including a reciprocating movement, the speed of which can reach three half-revolutions per minute and a continuous movement the speed of which can reach 10 revolutions per minute.

The operation described is of the type in which charging and discharging are discontinuous. It could nevertheless be carried out continuously with drying and preheating of the charge in a rotating furnace or in the fluidizing appliance 31 comprising two or more stages.

The charge comprises, per ton of steel produced:
1,500 kg. of dried laterites from Suriago (Philippines) whereof the nickel content is 1.6 percent, the chromium content 4 percent, and the iron content 47 percent.
400 kg. of Soviet chromium ore containing 56 percent $Cr_2O_3$,
23 kg. of molybdenum in the form of oxides,
90 kg. of nickel in the form of oxides,
500 kg. of carbon in the graphite state,
60 kg. of baked lime,
15 kg. of rich manganese ore.

The blast of oxygen and methane, in the ratio of 2.18 m.$^3$ of oxygen per cubic meter of methane, is started. Only the jet 9 of oxygen from the converter directed upwards and the reverse-flow jet 27 are then in operation. The delivery of methane reaches 150 Nm.$^3$ per hour.

At the end of 1 hour 30 min., a 100 kg. of calcium carbide are charged, the temperature then reaching 1,750° C. At the end of 2 hour 30 min., the temperature reached 1,920° C., so as to reduce the slag as completely as possible.

The slag is then fluid. It is partially cleaned. Analysis of the metal is then as follows:
carbon 7.2 percent, chromium 18 percent, nickel 11.2 percent, molybdenum 2.1 percent, iron remainder.

The operation of refining is then carried out, first in the presence of the methane flame and oxygen. When the carbon content has dropped to 2 percent, the methane burner is stopped, and only the jet of oxygen directed towards the bath is kept going.

For 23 CN 18-10 steels (the analyses of which are given hereinafter) an oxygen nozzle is introduced through the door and directed towards the bath at the end of the operation, and refining ends at a carbon content of 0.079 percent for the 26 CND 18-10-3 variation, and 0.030 percent for the 23 CND 18-10-3 variation. The chromium contents are 14 percent in the first case and 8 percent in the second. The temperature exceeds 1,900° C.

The blast is then stopped, and the furnace is kept in reciprocating rotation for a few revolutions in order to ensure that the metal is homogeneous.

The silicon-heating period is then started. It is carried out with ferrosilicon containing 75 percent silicon.

The bath is cooled to 1,600° C. by additives of iron powder produced by reduction with hydrogen of rich ores completely devoid of carbon. These additives make it possible to reduce the carbon content to 0.06 percent in the first case, and to 0.025 percent in the second case.

The metal is then poured in the ladle. Its chemical composition corresponds to the analysis:

| 26 CND 18-10-3: | | | 23 CND 18-10-3 | | |
|---|---|---|---|---|---|
| C | 0.06 | % | C | 0.025 | % |
| Si | 0.25 | % | Si | 0.30 | % |
| Mn | 0.7 | % | Mn | 0.7 | % |
| S | 0.010 | % | S | 0.010 | % |
| P | 0.010 | % | P | 0.010 | % |
| Cr | 18 | % | Cr | 18 | % |
| Ni | 11 | % | Ni | 11 | % |
| Mo | 2.2 | % | Mo | 2.2 | % |
| N | 0.001 | % | N | 0.001 | % |
| H | 0.0002 | % | H | 0.002 | % |
| Cu. Sn: incapable of quantitative analysis | | | Cu. Sn: incapable of quantitative analysis | | |
| Fe | remainder | | Fe | remainder | |

The yield of chromium reached 85 percent.

Example 12

Nickel-chromium structural steel containing 1.4 percent nickel of the type defined by the AFNOR 35 NC 6 standards was prepared.

The laterite used in this case comes from the Conakry deposit in Guinea (stratum C). It is characterized by the following analyses in the dry state:

Fe 54%–Cr 1.1%–Ni 0.78%, and may be used directly without additives.

The furnace is a pilot furnace lined with magnesia and fed discontinuously.

Its dimensions are as follows:

internal diameter: 1,70 m.

length       : 3.40 m.

The charge comprises:

4.1 tons of Conakry ore dried and made into pellets, 950 kg. of carbon in the form: either of anthracite or of graphite, 40 kg. of rich manganese ore.

An additive of lime was used, in order to obtain a well melted and desulfurizing slag.

Little lime is added when graphite is used as the reducer.

The furnace is heated with methane. It was equipped with means for injecting oxygen, as described in example 1, that is, primary oxygen-injection into the appliance called a converter;

selective oxygen-injection through three nozzles for which the jets are directed upwards, towards the bath and horizontally; and reverse-flow oxygen-injection through a nozzle 27 passing through the chimney and entering the furnace.

The charge is first preheated in the furnace by contact with a flame produced by combustion of methane with air. A corresponding burner, of the usual type, is substituted for the converter during this preheating period, which lasts for 75 minutes. The charge then reaches a temperature of 1,000° C. The haematite oxide $Fe_2O_3$ was completely reduced to the state of $Fe_3O_4$, and the magnetic oxide $Fe_3O_4$ was partially reduced to the state of FeO. This summary preheating may be advantageously replaced by preheating with fluidization or in a rotating furnace.

In a second phase, the converter is coupled to the furnace, and the reduction stage starts. It lasts approximately 1 hour 30 mins. The deliveries of methane and oxygen are adjusted so as to keep the ratio of partial pressures $CO^2/CO+CO^2$ as high as possible, and at least 80 percent. In order to do this, the deliveries of the various oxygen nozzles and the methane nozzle and the speed of the furnace have their adjustments altered during operation.

For 20 minutes, it is advantageous to blow methane at the rate of 200 Nm.³ per hour, and oxygen at the rate of 580 Nm³. Only the nozzle 9 keeping the jet upwards and the reverse-flow nozzle 27 are in operation. The delivery of methane is then reduced to a low level of the order of 40 Nm.³ per hour, and the oxygen delivery reaches 400 Nm.³ per hour.

One hour 10 mins. later the metal is molten and has the following composition:

C3.6%–Ni1.42%–Cr1.9%–Mn1%–Fe remainder

Refining is carried out by bringing into operation the nozzle 28, with its jet directed towards the bath. A small input of methane is maintained until ten minutes before the end of the operation. The jet of oxygen is maintained through the reverse-flow nozzle 27.

The drop in carbon is determined by a quick-action analyzer.

The jet of oxygen 28 from the top is reduced at the end of decarburisation, in order to control the carbon content reached.

Refining lasts for 30 minutes. The temperature at the end of refining reaches 1,660° C. The metal obtained is left for a few minutes, and then poured and stilled in the ladle. Its weight is 2,100 kg.

It has the following analysis:

| | | |
|---|---|---|
| C | 0.35 | % |
| Ni | 1.4 | % |
| Cr | 1.0 | % |
| Mn | 0.75 | % |
| S | <0.001 | % (using graphite) |
| P | <0.020 | % |
| Cu, Sn | traces | |

The foregoing examples 11 and 12 concern the reduction of lateritic ores, but the invention also covers the use of the process described above for the production of steel containing 13 percent chromium and 2 percent carbon for cold working designated by the AFNOR Z 200 C 13 standard, and the derived steels AFNOR Z 190 C D 12-1 or ASM 11 C, 11 D2 and 11 D3 for example, starting directly from a mixture of chromium ores and iron-bearing products, ores, powders, scrap.

The chromium ore, as rich as possible, is charged into a furnace of the type described above. The chromium ore has previously been mixed with an iron ore which is itself poor in gangue and phosphorus, and with iron powder produced by reducing as pure as possible an iron ore or scrap by the gas in a solid medium.

The charge is mixed with a solid reducer such as graphite or a poor coal or coke dust, and is then charged into the furnace either at once or in several stages through the lateral door of the furnace, or continuously through the chimney end of the furnace. It may have been previously preheated or prereduced.

The grain size of the charge is so controlled as to prevent the finished products from being carried along by the fumes to an excessive extent, and to prevent the largest products from taking too long to reduce.

In practice, it is recommended that 90 percent of the charge of ores be within the range of grain size from 0.1–20 mm.

Heating is provided by burning natural gas with oxygen, and the proportions of methane and oxygen are adjusted so as to make the temperature in the furnace as high as possible, to limit the transfer of oxygen to the bath and to prevent an excessive quantity of solid fuel from being consumed.

In discontinuous operations, the temperature of the charge increases progressively and the carbon starts to reduce the chromium oxides at 1,400° C.

An important result of the operation obtained when the chromium ores are rich, and have a gangue consisting chiefly of alumina and magnesia, is that the grains of ore remain in the solid state up to high temperatures, without the occurrence of any phenomena of agglomeration or passing through the state of a paste. The metal bath is therefore covered by a solid mass in course of reaction comprising grains of ore and grains of carbon. At the end of the operation, a certain amount of calcium carbide is added in order to complete the reduction of the chromium oxides.

The temperature may be raised to beyond 1,900° C. with this type of furnace, and with ores of suitable gangue, in particular, not too rich in silica. This fact constitutes the essential reason for the success of the operation. The chromium oxides are then very completely reduced, and the slag is fluid. It is partially cleaned. The metal is heavily carburized.

This stage of reduction is followed by a period of refining with oxygen.

For this purpose, the direction and pulsation of the jet of oxygen are altered, and the nozzle 28 is used so that the gases come into direct and violent contact with the bath. Fifteen to 20 minutes before the end of the operation, the methane feed is cut off, and decarburization is carried out with only the jet of oxygen 28 from above. The furnace is then driven at the maximum speed of rotation, i.e., 10 revolutions per minute. The drop in carbon is determined by a quick-action analyzer and is controlled by periods of homogenization during which the furnace is kept in rotation, the oxygen being cut off.

Refining is stopped when the carbon contents are in the vicinity of the maximum of the prescribed range. The temperature of the furnace is still very high, and the corresponding reserve of enthalpy is used if required to allow for slight corrections in carbon content with the aid of slightly carburized scrap or iron powder, remelting of falls of steel of the quality aimed at, and additives of ferrosilicon and lime.

All these additives were previously carefully dried.

The metal is poured in the ladle, and the final slag into a shaft placed beneath the furnace for this purpose. The metal sets suitably in ingot-molds.

EXAMPLE 13

The furnace used is a small pilot furnace lined with magnesia of the type described above, having the following dimensions:

diameter: 1.20 meter
length between rotating packings and chimney: 4 meters.

The furnace is equipped with a lateral charging door. Calorific energy is introduced, the fuel used being purified Lacq natural gas with a low sulfur content.

Oxygen is introduced into the converter at the orifice thereof in the direction of the furnace with the aid of two nozzles, one being nozzle 9 whose jet is directed towards the top of the furnace, and the other being nozzle 28 which has a very highly pulsating jet directed towards the bath. At the orifice of the furnace on the chimney side and in reverse flow to the movement of the methane and primary oxygen, oxygen is introduced by the nozzle 27.

The furnace has two movements, one being a reciprocating movement whereof the speed can reach three half-revolutions per minute;
    a continuous movement the speed of which can reach 10 revolutions per minute.

The operation hereinafter described is of the discontinuous type, with charging through the door.

The charge comprises:
1. 550 kg. of Soviet chromium ore, whereof the composition is as follows when dry:

| | |
|---|---|
| Cr₂O₃ | 56.5 % |
| Iron oxide | 14.5 % |
| SiO₂ | 6 % |
| Al₂O₃ | 10 % |
| MgO | 12.5 % |
| MnO | 0.3 % |
| CaO | 0.2 % |

2. 1,000 kg. of iron powder emanating from reduction with hydrogen of a rich ore having the following composition:

| | |
|---|---|
| Metallic iron | 85 % |
| Iron oxide | 10.5 % |
| Oxygen | 3 % |
| Alumina, silica | 1.5 % |

3. 450 kg. of graphite in grains of 0.5 to 20 mm.

The furnace is then lit. Oxygen is admitted into the converter, and to the nozzle 9 and is directed towards the top of the furnace.

The proportion of oxygen to methane is 2.18. The delivery of methane is 145 Nm.³ per hour.

The furnace is opened at the end of 90 minutes to add a further 50 kg. of graphite and 100 kg. of pieces of calcium carbide.

At the end of 120 minutes, the bath appeared to be covered with a layer of unagglomerated grains of ores and grains of graphite.

At the end of 180 minutes, the temperature of the walls reached 1,920°.

The metal had the following composition:

| | |
|---|---|
| C | 7 % |
| Cr | 14.5 % |

The slag is partially cleaned. It has the following analysis:

| | |
|---|---|
| Cr₂O₃ | 10 % |
| CaO | 26 % |
| SiO₂ | 13 % |
| Al₂O₃ | 19 % |
| MgO | 8 % |
| Iron oxide | 4 % |

Refining is then started. The methane is first kept at its initial delivery, but the quantity of oxygen blown in is increased.

The carbon content falls at the rate of 5 percent per hour.

The flame is cut off at the end of 30 minutes at a carbon content of 4.5 percent, and the furnace is set in rotation again for 30 minutes without any external contribution of either heat or oxygen. The carbon content falls to the level of 4 percent.

Blowing with oxygen alone is then resumed for 15 minutes with the furnace rotating at its maximum speed. The carbon content is controlled by stopping the blowing and oscillation for a few minutes at a time with the furnace closed.

A stop is made at a carbon content of 2.10 percent. The bath then has the following composition:

| | |
|---|---|
| C | 2.1 % |
| Cr | 13 % |
| S | 0.010 % |
| P | 0.012 % |

The temperature is 1,800°. Before pouring, the following are added:
    3 kg. of 96 percent silicon
    40 kg. of iron of very high purity containing less than 0.005 percent of carbon.
    50 kg. of scrap of the Z 200 Cr 13 type.

The furnace is set in rotation again for a few minutes in order to allow this addition to melt.

The weight of metal poured into the ingot mold is 1,150 kg.

The final analysis obtained is as follows:

| | |
|---|---|
| C | 2.04 % |
| Cr | 12.5 % |
| Si | 0.25 % |
| P | 0.015 % |
| S | 0.010 % |
| Mn | traces |
| Ni | traces |

The yield of chromium is 72 percent.

The relatively heavy consumption of fuels and oxygen is due to the small dimensions of the pilot furnace.

EXAMPLE 14

A quantity of 150 kg. of Z 200 C 13 scrap is substituted for the iron powder at the beginning of the operation. The weight of chromium ore is reduced from 550 kg. to 500 kg. The operation is carried out as in example 3.

EXAMPLE 15

1,000 kg. of rich Itabira ore are substituted for the iron powder. The weight of chromium ore is reduced from 550 to 500 kg. The weight of initial graphite is increased from 450 kg. to 650 kg. At the same time, 80 kg. of lime are added to the charge.

The reduction period is carried out as before but is about 1 hour longer.

Refining is carried out with a more oxidizing final slag so as to keep the phosphorus content below 0.025 percent.

The yield of chromium is 66 percent.

The invention also applies to the case in which it is desired to produce alloyed steels and stainless steels with a very low carbon content. It enables the decarburization reactions to be accelerated when the operation of reducing ores by carbon-heating is finished.

When the operation of reducing by carbon-heating is finished, and the period of refining the bath starts, the furnace may be set in rapid rotation, at a speed of at least 25 revolutions per minute.

It is furthermore advantageous to direct a jet of oxygen towards the bath during this period of rapid rotation.

At the refining stage, it is no longer desirable to protect the carbon from the oxidizing atmosphere of the fumes and the reactions of forming carbon monoxide must be encouraged at the expense of the oxygen in the atmosphere of the furnace and the reducible oxides in the slag.

Increasing the speed of rotation of the furnace causes a large amount of carbon monoxide to be given off, and it is possible to combat this by forming carbon dioxide, for example by blowing in oxygen through a nozzle situated on the side of the furnace on which the fumes emerge.

Under these conditions, the bath maintains a very high temperature, which may exceed 1,950° C., and the reactions cause the charge to develop towards a balance between carbon, oxygen and the alloy metal in the metallic phase, and the oxides, in particular the oxide of the alloy metal in the slag phase.

At the temperature levels reached, this balance corresponds to very low carbon content in the metal phase, without a high degree of oxidization of the alloy metal.

The speed of rotation of the furnace must be at least 25 revolutions per minute. This speed is preferably 30 to 35 revolutions per minute for large furnaces, for example those having an internal diameter of more than 2.50 meters, and this speed may exceed 50 revolutions per minute for small furnaces, having an internal diameter of the order of 1.50 meter.

Several examples will now be described so that the invention may be better understood.

EXAMPLE 16

Preparation of stainless steels containing molybdenum known as 18-8 steels (standards AFNOR 26 CND 18-10-3 and AFNOR 23 CND 18-10-3, or AISI 316 and 316 L) uses reduction by carbon-heating in accordance with example 11, and this operation is stopped at a temperature of 1,920° C.

Refining is then carried out in the furnace used for carbon-heating with a speed of rotation increasing up to 40 revolutions per minute when the carbon content has fallen to 2 percent.

At this instant, a jet of oxygen directed towards the bath is substituted for the jet of oxygen which was directed towards the top of the furnace during the carbon-heating operation.

The speed of rotation is then increased to 45 revolutions per minute.

Refining is finished at 1,950° C., with a total yield of chromium exceeding 65 percent before any ferrosilicon is added.

The addition of ferrosilicon is limited to a weight corresponding to 30 kg. of added silicon.

The analysis of the metal is the same as that given in example 11. The overall yield of chromium reaches 85 percent.

EXAMPLE 17

Preparation of a manganese iron alloy having a very low carbon content using a rotary furnace of the type according to the invention was charged with 300 kg. of manganese ore from Moanda (Gaboon) having the following analysis by weight:

| | | |
|---|---|---|
| Mn | Total | 50.5 % |
| Fe | Total | 4.8 % |
| CaO | Total | 0.35 % |
| $SiO_2$ | Total | 2.60 % |
| $Al_2O_3$ | Total | 5.4 % |
| hydrates (firing loss) | Total | 15.10 % |

950 kg. of iron powder were also added to the furnace, this being derived from reduction by hydrogen of iron concentrates from Sierra-Leone, having the following analysis by weight:

| | | |
|---|---|---|
| Fe | Total | 92.5 % |
| $O_2$ | Total | 6 % |
| $SiO_2$ | Total | 0.2 % |
| $Al_2O_3$ | Total | 0.6 % |

The reducer used was 300 kg. of graphite.

Finally, 60 kg. of pure gas-baked lime were added.

The charge was first subjected to a carbon-heating reducing operation as described above, the temperature rising progressively to 1,850° C., and the furnace rotating at 10 revolutions per minute.

The bath then had the following analysis by weight:

| | |
|---|---|
| Mn | 14 % |
| C | 6 % |
| Fe | remainder |

The refining period was then started by accelerating the speed of rotation of the furnace to 45 revolutions per minute and actuating an oxygen nozzle whose jet was directed towards the bath.

Refining was finished at 1,950° C. with a metal having the following analysis by weight:

| | | |
|---|---|---|
| Mn | 12 | % |
| C | 0.015 | % |
| S | traces | |
| P | traces | |
| N | 0.001 | % |
| H | 0.00015 | % |

This metal is very pure.

The invention is not limited to the details of the embodiments of the furnaces which have been described, nor to the details of the methods which have been discussed and these details may be modified without departing from the scope of the invention.

I claim:

1. Process for reducing oxides of iron, chromium, manganese, vanadium, zinc and nickel which are difficult to reduce comprising the steps of introducing a charge of the oxide to be reduced, products forming the slag and carbon into a rotating furnace having a substantially horizontal axis, heating the furnace by a short flame situated above the reduction zone over the charge, the temperature of the hottest part of the flame being at least 1,900° C. and producing the flame by mixing two volumes of oxygen and one volume of gaseous hydrocarbon, burning three additional volumes of gaseous hydrocarbon therein converting the gaseous hydrocarbon into a mixture of carbon monoxide and hydrogen at about 1,250°

C. and then burning said carbon monoxide and hydrogen by a jet of two additional volumes of oxygen, the jet of oxygen having a velocity directing the resulting flame toward the top of the furnace at a temperature of about 1,900° C. producing carbon dioxide and water with release of heat, the jet of oxygen aspirating the gases issuing from the charge.

2. Process as described in claim 1, the flame being blown into the furnace by industrial oxygen to obtain an oxidizing flame above the mixture and controlling the amount of oxygen supplied to the flame to provide an atmosphere in the furnace meeting the relationship $CO_2/CO+CO_2$ greater than 0.8 during elaboration of the metals.

3. Process as described in claim 1 including the step of introducing a jet of oxygen countercurrent to the flame adjacent to the gas exit from the furnace, thereby circulating the carbon monoxide from the charge toward the flame.

* * * * *

PO-1050
(5/69)

UNITED STATES PATENT OFFICE
CERTIFICATE OF CORRECTION

Patent No. 3,640,701        Dated February 8, 1971

Inventor(s) Jean Bouchet

It is certified that error appears in the above-identified patent and that said Letters Patent are hereby corrected as shown below:

Date of Patent "February 8, 1971" should be --February 8, 1972--.

Signed and sealed this 30th day of January 1973.

(SEAL)
Attest:

EDWARD M. FLETCHER, JR.　　　　　　　ROBERT GOTTSCHALK
Attesting Officer　　　　　　　　　　　Commissioner of Patents